United States Patent

Brown et al.

Patent Number: 5,678,852
Date of Patent: Oct. 21, 1997

[54] METHOD AND APPARATUS FOR INFLATING AN INFLATABLE VEHICLE OCCUPANT RESTRAINT

[75] Inventors: Louis R. Brown, Oxford; Edward J. Burley, Romeo, both of Mich.; Peter F. Layer, Lockport, N.Y.

[73] Assignee: TRW Vehicle Safety Systems Inc., Lyndhurst, Ohio

[21] Appl. No.: 628,404

[22] Filed: Apr. 5, 1996

Related U.S. Application Data

[63] Continuation of Ser. No. 209,565, Mar. 10, 1994, abandoned.

[51] Int. Cl.⁶ ................................................ B60R 21/22
[52] U.S. Cl. .................... 280/730.2; 280/728.2; 280/743.2
[58] Field of Search ........................ 280/730.2, 730.1, 280/728.1, 728.2, 743.2, 743.1

[56] References Cited

U.S. PATENT DOCUMENTS

| | | | |
|---|---|---|---|
| 5,072,966 | 12/1991 | Nishitake et al. | 280/730.2 |
| 5,094,475 | 3/1992 | Olsson et al. | |
| 5,112,079 | 5/1992 | Haland et al. | |
| 5,161,821 | 11/1992 | Curtis . | |
| 5,251,931 | 10/1993 | Semchena et al. | |
| 5,316,336 | 5/1994 | Taguchi et al. | 280/730.2 |
| 5,333,899 | 8/1994 | Witte | 280/728.1 |
| 5,536,038 | 7/1996 | Bollaert et al. | 280/730.2 |

FOREIGN PATENT DOCUMENTS

| | | | |
|---|---|---|---|
| 3-248943 | 11/1991 | Japan | 280/743.1 |
| 4-123950 | 4/1992 | Japan | 280/743.1 |
| 5-238347 | 9/1993 | Japan | 280/730.2 |
| 5-345555 | 12/1993 | Japan | 280/730.2 |
| 93/08042 | 4/1993 | WIPO | 280/728.1 |

*Primary Examiner*—Eric D. Culbreth
*Attorney, Agent, or Firm*—Tarolli, Sundheim, Covell, Tummino & Szabo

[57] ABSTRACT

A method of inflating an inflatable vehicle occupant restraint (12) includes the step of directing inflation fluid to flow into the restraint (12) to inflate the restraint (12) in a vehicle (11) between a vehicle seat (16) and a side portion of the vehicle (11), such as a vehicle door (18). The inflation fluid increases the internal fluid pressure of the restraint (12) toward a maximum internal fluid pressure as the inflation fluid flows into the restraint (12). The method further includes the step of constraining the restraint (12) to resist inflating the restraint (12) during at least a portion of the step of directing inflation fluid into the restraint (12). The step of constraining the restraint (12) causes the restraint (12) to reach a constrained volume at which the internal fluid pressure is approximately 70–100% of the maximum internal fluid pressure at approximately 6–8 milliseconds after the inflation fluid begins to flow into the restraint (12).

20 Claims, 7 Drawing Sheets

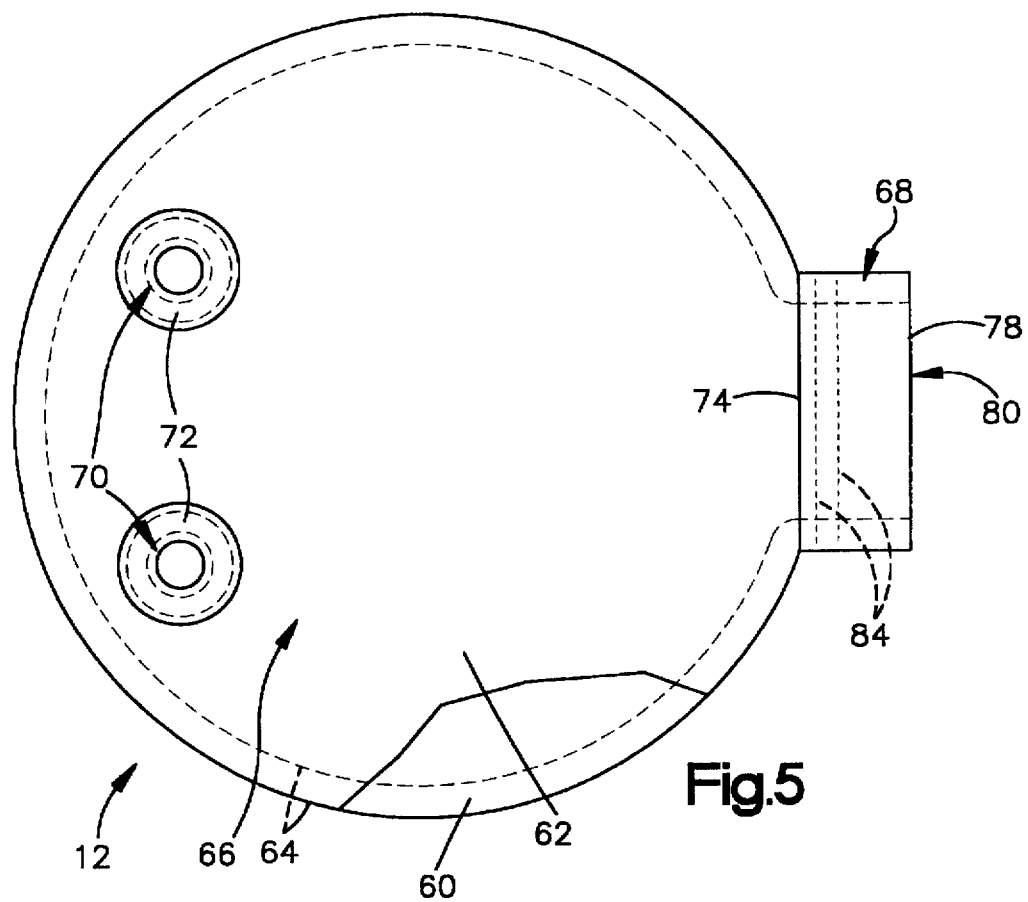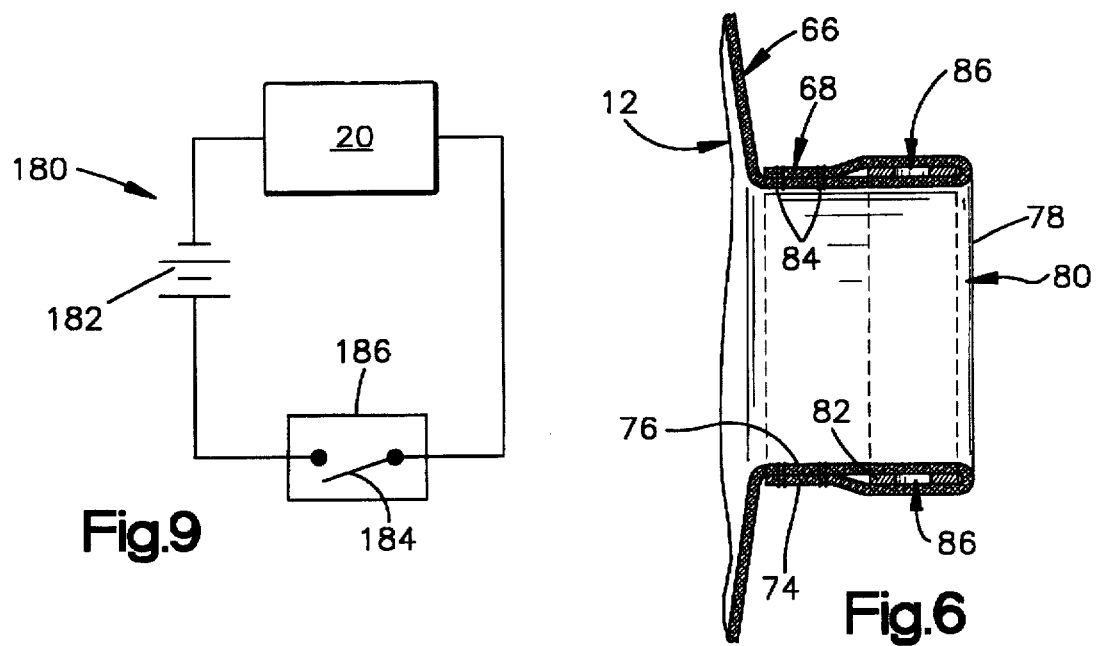

METHOD AND APPARATUS FOR INFLATING AN INFLATABLE VEHICLE OCCUPANT RESTRAINT

This application is a continuation of copending application Ser. No. 08/209,565 filed on Mar. 10, 1994, now abandoned.

FIELD OF THE INVENTION

The present invention relates to an inflatable vehicle occupant restraint, and particularly relates to a method and apparatus for inflating an inflatable vehicle occupant restraint.

BACKGROUND OF THE INVENTION

An inflatable vehicle occupant restraint, such as an air bag, is inflated when the vehicle experiences a collision. Inflation fluid is then directed to flow from a source of inflation fluid into the air bag. The inflation fluid increases the internal fluid pressure of the air bag and inflates the air bag to an inflated condition. When the air bag is in the inflated condition, it extends into the vehicle occupant compartment at a location adjacent to an occupant of the vehicle. The internal fluid pressure attained by the air bag is controlled so that the air bag can restrain the occupant from forcefully striking parts of the vehicle when the air bag is in the inflated condition.

In certain applications, the air bag is inflated when the vehicle experiences a side impact collision, such as a collision in which an impact is directed against a door at the side of the vehicle. The air bag is then inflated into the vehicle occupant compartment at a location between the door and an occupant of a seat adjacent to the door. The air bag is thus inflated into the occupant compartment so as to restrain the occupant from a forceful impact with the door as a result of the side impact collision.

SUMMARY OF THE INVENTION

In accordance with the present invention, a method and apparatus are provided for inflating an inflatable vehicle occupant restraint, such as an air bag. The method comprises the step of directing inflation fluid to flow into the air bag to inflate the air bag between a vehicle seat and a side portion of the vehicle, such as a door at the side of the vehicle. The inflation fluid increases the internal fluid pressure of the air bag toward a maximum internal fluid pressure as the inflation fluid flows into the air bag.

The method further comprises the step of constraining the air bag to resist inflating the air bag during at least a portion of the step of directing inflation fluid into the air bag. The step of constraining the air bag causes the air bag to reach a constrained volume at which the internal fluid pressure is approximately 70–100% of the maximum internal fluid pressure at approximately 6–8 milliseconds after the inflation fluid begins to flow into the air bag.

As a result of constraining the air bag in accordance with the present invention, the internal fluid pressure of the air bag reaches elevated levels more quickly than if the air bag were inflated freely without being constrained.

The apparatus includes a means for supporting the air bag in a position from which the air bag moves between the vehicle seat and the side portion of the vehicle when the air bag is inflating. The apparatus thus directs the air bag to be constrained by and between the seat and the side portion of the vehicle. In a preferred embodiment of the present invention, the air bag is supported on the seat, and moves forcefully against a door at the side of the vehicle so as to be constrained by and between the seat and the door. In another preferred embodiment of the present invention, the air bag is supported on the door, and moves forcefully against the seat so as to be constrained by and between the seat and the door.

In accordance with another feature of the present invention, the apparatus includes an inflator means and a directing means. The inflator means provides the inflation fluid which inflates the air bag, and includes a means for emitting the inflation fluid from the inflator means in a first direction. The directing means directs the inflation fluid from the inflator means into the air bag, and includes a directing structure. The directing structure has a surface means for defining an exit opening through which the inflation fluid can flow from the directing structure into the air bag in a second direction opposite to the first direction. The directing structure also has a wall means for directing the inflation fluid to turn from the first direction to the second direction. The wall means includes first and second curved wall surfaces which are spaced from the exit opening in the second direction. Each of the curved wall surfaces faces toward the exit opening, and is concave relative to the exit opening.

BRIEF DESCRIPTION OF THE DRAWINGS

The foregoing and other features of the present invention will become apparent to those skilled in the art to which the present invention relates from reading the following description with reference to the accompanying drawings, in which:

FIG. 5 is a view of an inflatable vehicle occupant restraint shown schematically in FIG. 1;

FIG. 6 is a partial sectional view of the restraint shown in FIG. 5;

FIG. 9 is a schematic view of an electrical circuit included in the apparatus of FIG. 1;

DESCRIPTION OF PREFERRED EMBODIMENTS

Figure 1:
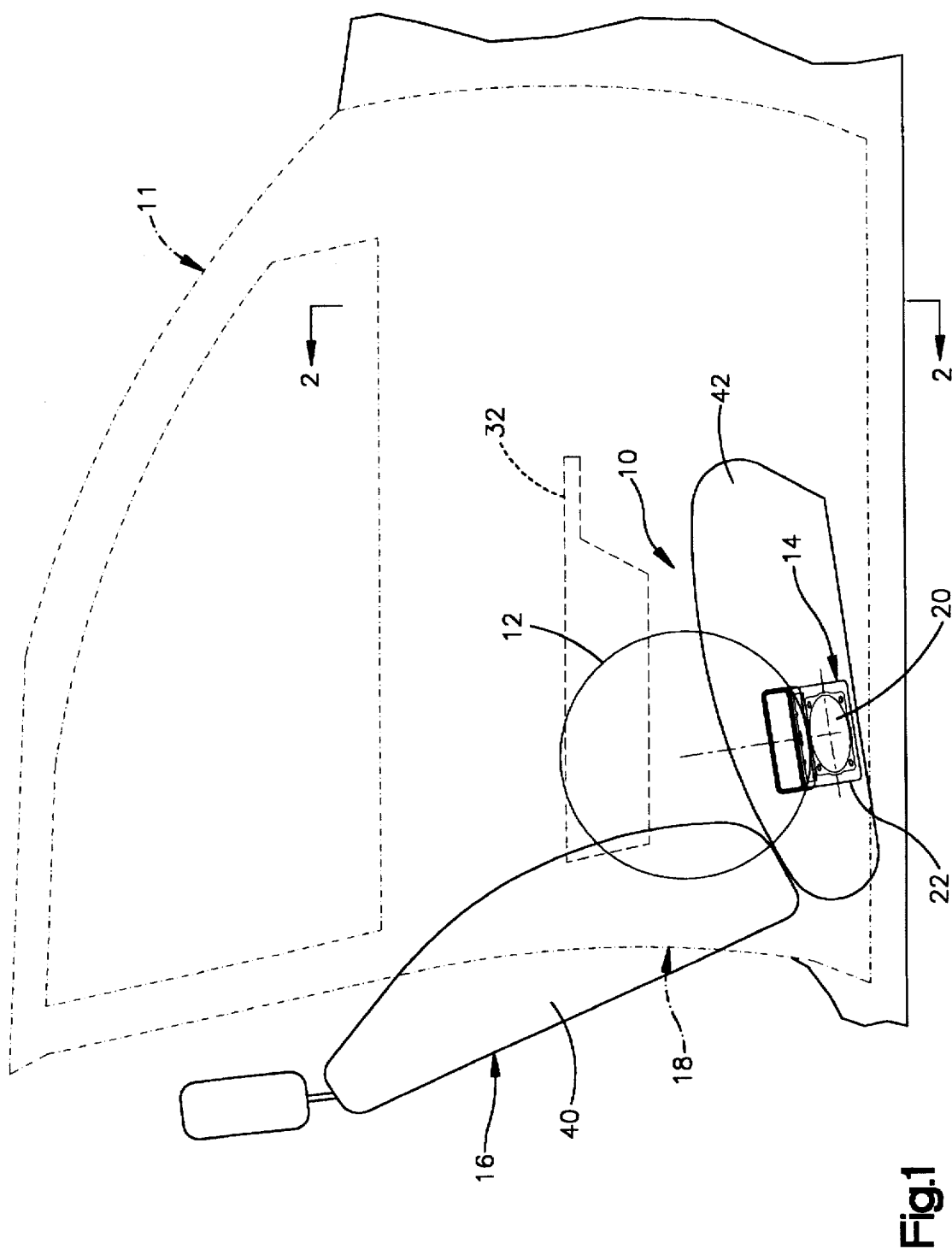
FIG. 1 is a schematic view of a vehicle door at the side of a vehicle, a vehicle seat adjacent to the door, and a vehicle occupant restraint apparatus comprising a first embodiment of the present invention.

A vehicle occupant restraint apparatus 10 comprising a first embodiment of the present invention is shown schematically in FIG. 1. The apparatus 10 is mounted in a vehicle 11, and includes an inflatable vehicle occupant restraint 12 which is commonly referred to as an air bag. The air bag 12 is part of an air bag module 14 which is mounted on a vehicle seat 16 adjacent to a door 18 at the side of the vehicle 11. The air bag module 14 includes an inflator 20 and a manifold 22 in addition to the air bag 12.

When the vehicle 11 experiences an impact which indicates the occurrence of a collision, such as a side impact to the door 18, the inflator 20 is actuated. The inflator 20 then emits a large volume of inflation fluid into the manifold 22. The manifold 22 directs the inflation fluid into the air bag 12 to inflate the air bag 12 from a stored, folded condition to an inflated condition. When the air bag 12 is in the inflated condition, as shown in FIG. 1, it extends between the seat 16 and the door 18 to protect an occupant of the seat 16 from a forceful impact with the door 18.

Figure 2:
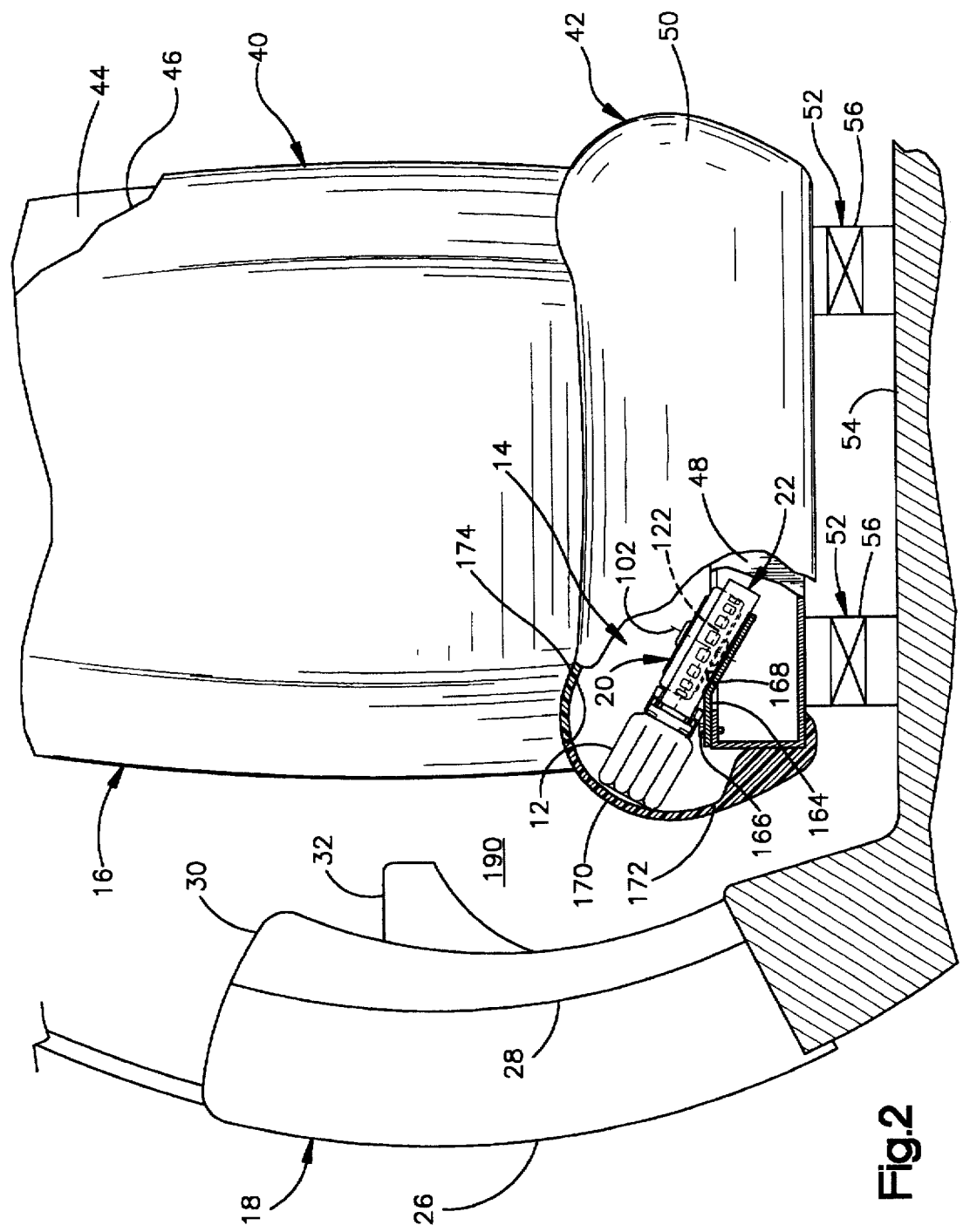
FIG. 2 is a schematic view taken on line 2—2 of FIG. 1.

As shown in FIG. 2, the door 18 has an outer structural panel 26, an inner structural panel 28, and an inner trim panel 30. The inner trim panel 30 covers the inner structural panel 28 and includes an armrest structure 32.

The seat 16 includes a seat back assembly 40 and a seat cushion assembly 42. The seat back assembly 40 includes an upper frame 44 and a pad 46. The pad 46 is supported on the upper frame 44 in a known manner. The seat cushion assembly 42 includes a lower frame 48 and a seat cushion 50. The lower frame 48 supports the seat cushion 50 in a known manner, and also supports the upper frame 44 in a known manner. A pair of track assemblies 52 support the lower frame 48 on the vehicle floor 54. Each track assembly 52 includes a respective bearing assembly 56. The bearing assemblies 56 enable the lower frame 48 to slide along the track assemblies 52 for adjustment of the position of the seat 16. Such track assemblies are known in the art.

The parts of the air bag module 14, including the air bag 12, the inflator 20, and the manifold 22, are shown in greater detail in FIGS. 5–8. As shown in FIG. 5, the air bag 12 has a front panel 60 and a rear panel 62. The front and rear panels 60 and 62 are formed of a known fabric, and are secured to each other by stitches 64 so as to define a body 66 and a neck 68 of the air bag 12.

The body 66 of the air bag 12 has a circular peripheral shape, as viewed in FIG. 5, and has an elliptical cross-sectional shape when inflated. The rear panel 62 defines a pair of vent holes 70 on the body 66, and is reinforced by a pair of fabric rings 72 which surround the vent holes 70. As shown in FIG. 6, the neck 68 of the air bag 12 includes a tubular outer piece 74 which is folded over a contiguous tubular inner piece 76. The neck 68 thus has a tubular shape with a folded edge 78 that defines an opening 80 into the air bag 12. A rectangular retainer ring 82 is received between the inner and outer pieces 74 and 76 of the neck 68, and is secured within the neck 68 by a plurality of stitches 84 that hold the pieces 74 and 76 together. A plurality of openings 86 extend through the retainer ring 82.

Figure 7:
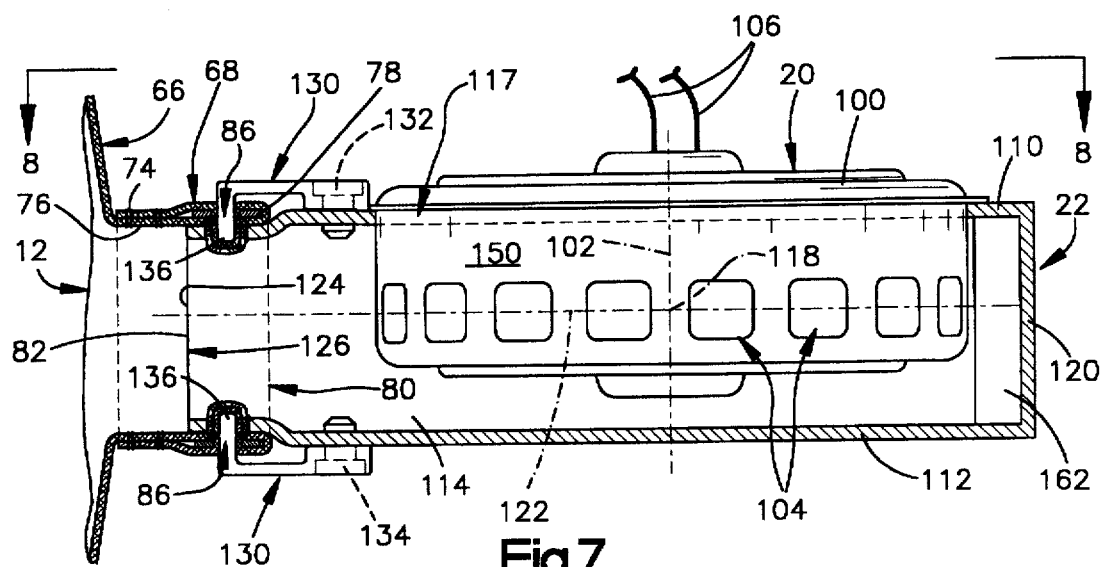
FIG. 7 is a view showing other parts of the apparatus of FIG. 1.
Figure 8:
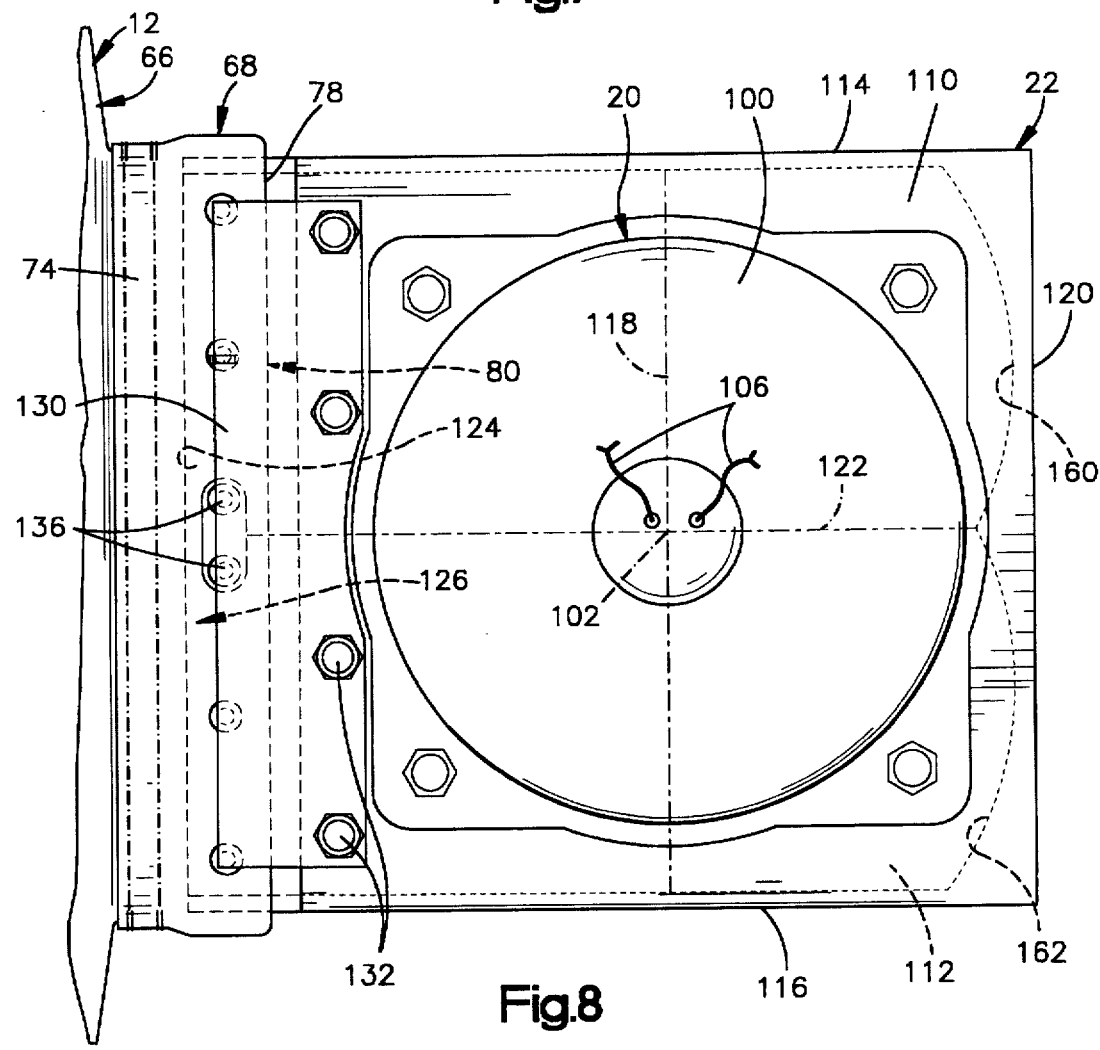
FIG. 8 is a view taken on line 8—8 of FIG. 7.

As shown in FIGS. 7 and 8, the inflator 20 has a short, cylindrical housing 100 with a central axis 102. The housing 100 has a plurality of gas outlet openings 104 in an array extending circumferentially around the axis 102. An ignitable gas generating material (not shown) is contained in the housing 100 and, when ignited, generates a large volume of gas for inflating the air bag 12. The gas generating material may have any suitable composition known in the art, and is ignited upon the passage of electric current between a pair of lead wires 106. Although each of the preferred embodiments of the present invention shown in the drawings uses such an inflator to provide gas for inflating the respective air bag, other known sources of inflation fluid, such as a container of gas stored under pressure or a combination of stored gas and ignitable gas generating material, could be used as alternatives.

The manifold 22 is a box-like structure with a top wall 110, a bottom wall 112, and a pair of opposite side walls 114 and 116. The inflator housing 100 is received closely through a circular opening 117 in the top wall 110 of the manifold 22, and is spaced from the bottom wall 112, as shown in FIG. 7. The gas outlet openings 104 in the inflator housing 100 are thus located within the manifold 22.

The opposite side walls 114 and 116 of the manifold 22 close the sides of the manifold 22, and are spaced from the inflator housing 100 along a first manifold axis 118 that is perpendicular to the central axis 102. An end wall 120 of the manifold 22 is spaced from the inflator housing 100 along a second manifold axis 122 which is perpendicular to both the central axis 102 and the first manifold axis 118. The end wall 120 extends between the side walls 114 and 116, and thus closes one end of the manifold 22. An edge surface 124 of the manifold 22 defines a rectangular gas exit opening 126 at the other end of the manifold 22. The gas exit opening 126 is centered on the second manifold axis 122, and is spaced from the inflator housing 100 along the second manifold axis 122.

The air bag 12 is connected to the manifold 22 by a pair of clamping strips 130. One of the clamping strips 130 is fixed to the top wall 110 of the manifold 22 by fasteners 132, and the other clamping strip 130 is fixed to the bottom wall 112 of the manifold 22 by fasteners 134. Each of the clamping strips 130 has plurality of clamping fingers 136. The clamping fingers 136 on each clamping strip 130 project toward, and are aligned with, the clamping fingers 136 on the other clamping strip 130. Each of the clamping fingers 136 extends through a respective one of the openings 86 in the retainer ring 82. The tubular pieces 74 and 76 of the neck 68 of the air bag 12 are sized so that portions of the tubular pieces 74 and 76 can be drawn inwardly through the openings 86 by the clamping fingers 136, as shown in FIG. 7. The clamping strips 130 thus connect the neck 68 of the air bag 12 to the manifold 22, with the opening 80 into the air bag 12 being aligned with the gas exit opening 126 in the manifold 22.

As thus far described, the manifold 22 defines a gas flow space 150 which communicates the gas outlet openings 104 in the inflator housing 100 with the gas exit opening 126 in the manifold 22. When the inflator 20 is actuated, the gas generated by the gas generating material is emitted radially outward from the housing 100 throughout the entire circumferential array of gas outlet openings 104. The gas thus flows into the gas flow space 150 in a direction toward the gas exit opening 126, and also in directions toward the side walls 114 and 116 and the end wall 120. Since the manifold 22 is open only at the gas exit opening 126, the manifold 22 directs the gas that is emitted from all of the gas outlet openings 104 to flow through the gas exit opening 126 and into the air bag 12 to inflate the air bag 12.

In accordance with the foregoing feature of the present invention, the manifold 22 is designed to direct the gas to develop a flow which turns from the end wall 120 toward the gas exit opening 126. Specifically, the end wall 120 of the manifold 22 has a pair of curved inner wall surfaces 160 and 162 which partially define the gas flow space 150 within the manifold 22. Each of the curved inner wall surfaces 160 and 162 faces toward the gas exit opening 126 at the other end of the manifold 22, and is concave relative to the gas exit opening 126. When the gas is emitted from the inflator housing 100 as described above, some of the gas flows toward and against the end wall 120 in a direction extending at least partially from the left to the right along the axis 122, as viewed in FIG. 8. As the pressure of the gas forces the gas to flow along the end wall 120 between the side walls 114 and 116, the curved inner wall surfaces 160 and 162 direct the gas to turn in a direction extending at least partially to the left along the axis 122. The curved inner wall surfaces 160 and 162 thus direct the gas to develop a flow which turns from the end wall 120 toward the gas exit opening 126.

As shown in FIG. 8, the first curved inner wall surface 160 is preferably located entirely on a first side of the axis 122, and extends from the axis 122 to the side wall 114 in an arc which is centered approximately midway between the axis 122 and the side wall 114. The second curved inner wall surface 162 is preferably located entirely on a second side of the axis 122, and extends from the axis 122 to the other side wall 116 in an arc which is centered approximately midway between the axis 122 and the side wall 116. Moreover, the end wall 120 is symmetrical with respect to the axis 122. Therefore, the curved inner wall surfaces 160 and 162 have equal surface areas and equal radii of curvature. The end wall 120 is thus designed to direct the gas to flow toward the gas exit opening at a maximum flow rate.

The air bag module 14, as shown in FIG. 2, is supported on the lower frame 48 in the seat cushion assembly 42 by a bracket 164. The bracket 164 is fixed to the lower frame 48 by fasteners 166, and is fixed to the air bag module 14 by a weld 168 between the bracket 164 and the manifold 22. The bracket 164 thus supports the air bag module 14 in a position in which the second manifold axis 122 is inclined upwardly at an angle of approximately 30° from a horizontal line. Therefore, the manifold 22 directs the gas from the inflator 20 to flow into the air bag 12 predominantly in a direction which is inclined upwardly at an angle of approximately 30° from a horizontal direction.

As further shown in FIG. 2, the air bag 12 is located adjacent to a deployment door portion 170 of the seat cushion 50 when the air bag 12 is in the stored, folded condition. A hinge portion 172 of the seat cushion 50 extends horizontally in a direction lengthwise relative to the vehicle 11, and defines the lower edge of the deployment door portion 170. A stress riser portion 174 of the seat cushion 50 extends around, and defines the periphery of, the deployment door portion 170 between the opposite ends of the hinge portion 172.

The vehicle occupant restraint apparatus 10 further includes an electrical circuit 180. As shown schematically in FIG. 9, the electrical circuit 180 includes a power source 182 which is preferably the vehicle battery or a capacitor. The electrical circuit 180 further includes the inflator 20 and a normally open switch 184. The switch 184 is part of a sensor 186. The sensor 186 senses the occurrence of a vehicle collision for which inflation of the air bag 12 is desired to restrain an occupant of the vehicle 11, and closes the switch 184 upon sensing the occurrence of such a collision. The sensor 186 may be an acceleration sensor which senses vehicle acceleration of a magnitude and duration indicative of such a collision. Alternatively, the sensor 186 may be a crush sensor which senses crushing of the vehicle upon the occurrence of such a collision. Such sensors are known in the art. The sensor 186 preferably senses the occurrence of a collision in which an impact is directed against the side of the vehicle 11, such as an impact to the door 18. When the switch 184 is closed, the electrical circuit 180 directs electric current through the inflator 20 between the lead wires 106 (FIG. 7) to actuate the inflator 20 electrically.

When the inflator 20 is actuated, the gas emitted from the inflator 20 is directed into the air bag 12 by the manifold 22, as described above. As the gas begins to inflate and increase the internal fluid pressure of the air bag 12, it moves the air bag 12 forcefully against the deployment door portion 170 of the seat cushion 50 (FIG. 2). The stress riser portion 174 of the seat cushion 50 ruptures under the stress induced by the internal fluid pressure of the air bag 12. The stress riser portion 174 thus releases the deployment door portion 170 to be moved pivotally about the hinge portion 172 from a closed position (FIG. 2) to an open position (FIG. 3) under the influence of the air bag 12 as the air bag 12 inflates outwardly from the seat cushion 50.

Figure 3:
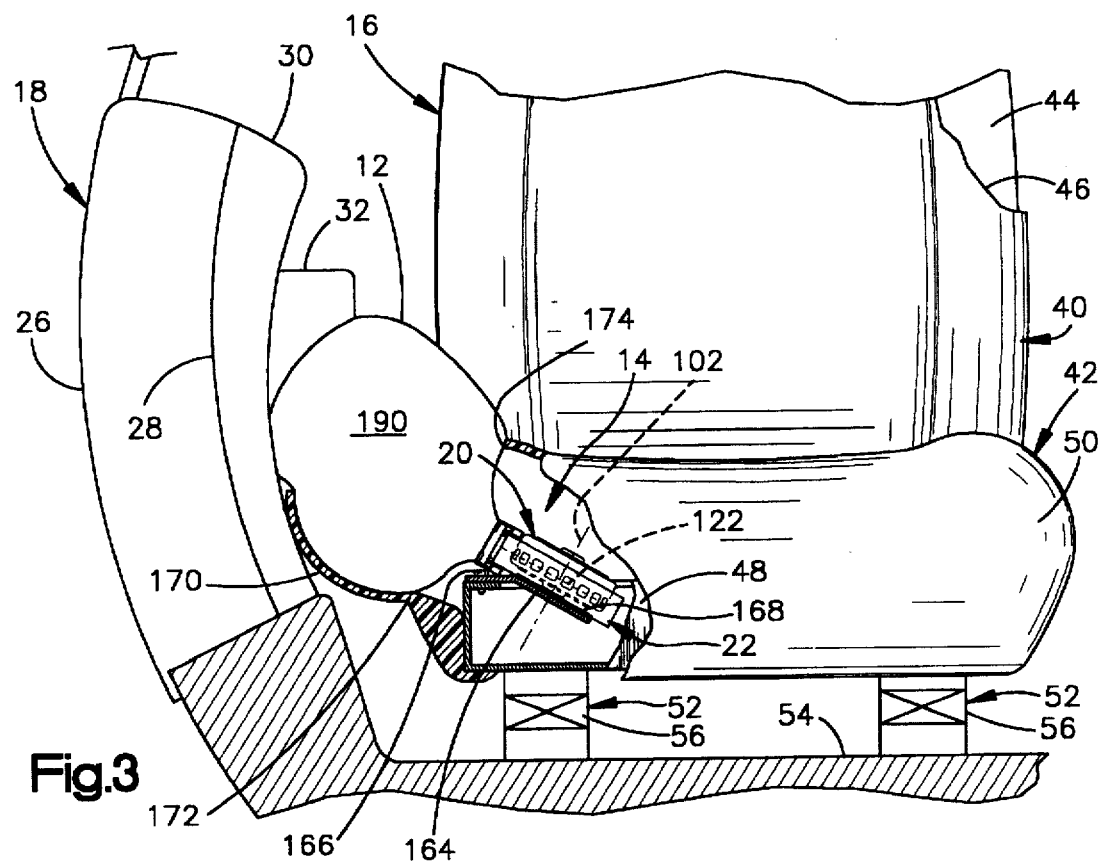
FIG. 3 is a schematic view similar to FIG. 2 showing parts in different positions.
Figure 4:
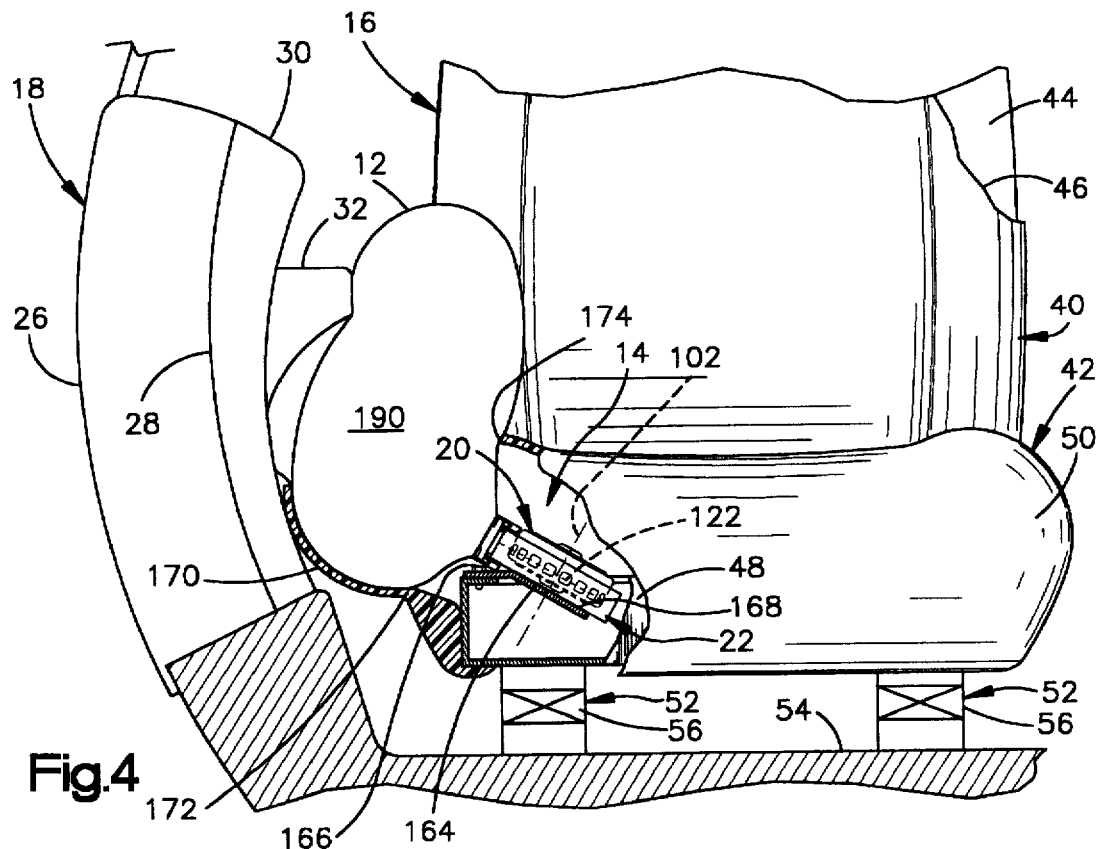
FIG. 4 also is a schematic view similar to FIG. 2 showing parts in different positions.

The gas flowing into the air bag 12 inflates the air bag 12 outwardly from the seat cushion 50 toward the inflated condition shown in FIG. 4. However, the air bag module 14 is supported on the seat 16 so as to direct the air bag 12 to move into and partially through a space 190 (FIG. 2) between the seat 16 and the door 18. The volume of the space 190 is less than the inflated volume reached by the air bag 12 when the air bag 12 is in the inflated condition of FIG. 4. Therefore, the air bag 12 moves forcefully into contact with the door 18 at the inner trim panel 30, as shown in FIG. 3, as the air bag 12 is being inflated toward the inflated condition of FIG. 4.

When the air bag 12 moves forcefully against the door 18 as shown in FIG. 3, the door 18 offers resistance to further inflation of the air bag 12. The combined resistance offered by the seat 16 and the door 18 constrains the air bag 12 between the seat 16 and the door 18. The air bag 12 is thus constrained to reach a constrained volume which is less than the inflated volume it would reach at the same time if it were inflating freely without being constrained. As a result of the lesser volume, the internal fluid pressure of the air bag 12 increases at a rate which is greater than the rate at which it would increase if the air bag 12 were inflating freely to a greater, unconstrained volume. Therefore, in accordance with the present invention, the internal fluid pressure of the air bag 12 is increased to an elevated level approaching the maximum level at a relatively early time following the impact to the vehicle 11.

Figure 10:
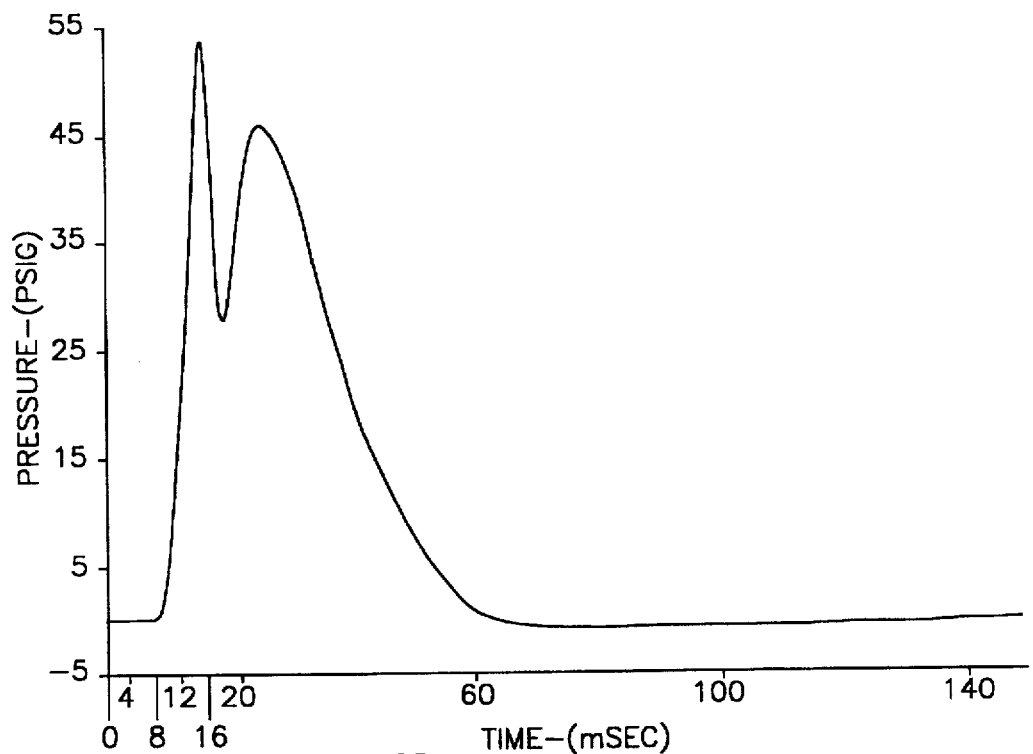
FIG. 10 is a graphic representation of performance data obtained upon actuation of a test apparatus constructed in accordance with the present invention.

The foregoing manner in which the vehicle occupant restraint apparatus 10 inflates the air bag 12 is illustrated graphically in FIG. 10. The curve shown in FIG. 10 represents performance data obtained upon actuation of a test apparatus constructed in accordance with the present invention. Specifically, the curve shown in FIG. 10 represents the internal fluid pressure measured over time in an air bag that was inflated in accordance with the present invention.

The test apparatus comprised an air bag module and an electrical circuit like the air bag module 14 and the electrical circuit 180 described above. The sensor in the electrical circuit was subjected to an impact, which simulated a side impact to a vehicle, at the time t=0 msec as shown in FIG. 10. The sensor responded to the impact by closing a switch to actuate the inflator in the air bag module at approximately 5 milliseconds after the impact, i.e., at approximately t=5 msec as shown in FIG. 10. The inflator provided inflation fluid which began to flow into the air bag at approximately t=8 msec. As indicated by the upward turn in the curve at that time, the gas then began to inflate the air bag and to increase the internal fluid pressure of the air bag toward a maximum internal fluid pressure.

In accordance with the present invention, the air bag in the test apparatus was constrained to resist inflating the air bag during at least a portion of the time that the gas was flowing into the air bag. The air bag was thus constrained to reach a constrained volume which was less than the inflated volume it would have reached at the same time if it had not been constrained. In this particular example, the air bag had a fully inflated volume capacity of 9 liters, and was constrained to reach a constrained volume of not more than approximately 5.4 liters at approximately 6 milliseconds after the gas began to flow into the air bag, i.e., at approximately t=14 msec as shown in FIG. 10. The internal fluid pressure of the air bag is shown to have reached approximately 40 psig at that time, and to have reached a maximum level of approximately 54 psig one millisecond later at approximately t=15 msec. Accordingly, as a result of constraining the air bag to reach a constrained volume of not more than approximately 60% of its fully inflated volume capacity at approximately 6 milliseconds after the inflation fluid began to flow into the air bag, the internal fluid pressure of the air bag reached approximately 74% of the maximum internal fluid pressure at that time. If the air bag had not been constrained in accordance with the present invention, the internal fluid pressure would not have reached the 74% level or the maximum level until approximately 2 milliseconds later at t=16 msec and t=17 msec, respectively. The internal fluid pressure in the air bag is thus increased at a greater rate in accordance with the present invention so that the air bag more quickly reaches elevated internal fluid pressure levels.

In another test apparatus like the test apparatus described above, an air bag with a fully inflated volume capacity of approximately 30 liters was similarly inflated to a constrained volume of not more than approximately 50% of its fully inflated volume capacity, i.e., not more than approximately 15 liters, at approximately 8 milliseconds after the gas began to flow into the air bag. The internal fluid pressure reached a level of approximately 15 psig at that time, which was approximately 75% of the maximum internal fluid pressure level of 21 psig. In conducting such tests of the present invention, the best results were obtained when the flow of gas through the vent holes in the air bag was not blocked by the surface of the door when the air bag was being constrained by the door.

In accordance with another feature of the present invention, the air bag module 14 directs the inflating air bag 12 to remain adjacent to the pelvic region of the anatomy of an occupant of the seat 16. As described above, the air bag module 14 is supported on the seat cushion assembly 42 at an inclined angle of approximately 30°. The air bag module 14 thus directs the air bag 12 to emerge initially from the seat cushion assembly 42 at a preferred location which will adjoin only the lower, pelvic region of the occupant's anatomy, rather than both the pelvic region and the upper, abdominal region. Moreover, if the vehicle collision causes the door 18 to move forcefully against the seat 16 so as to pivot the air bag module 14 upwardly, i.e., in a clockwise direction as viewed in FIG. 3, the low initial position of the inflating air bag 12 will ensure that the air bag 12 remains adjacent to the pelvic region of the occupant's anatomy.

Figure 11:
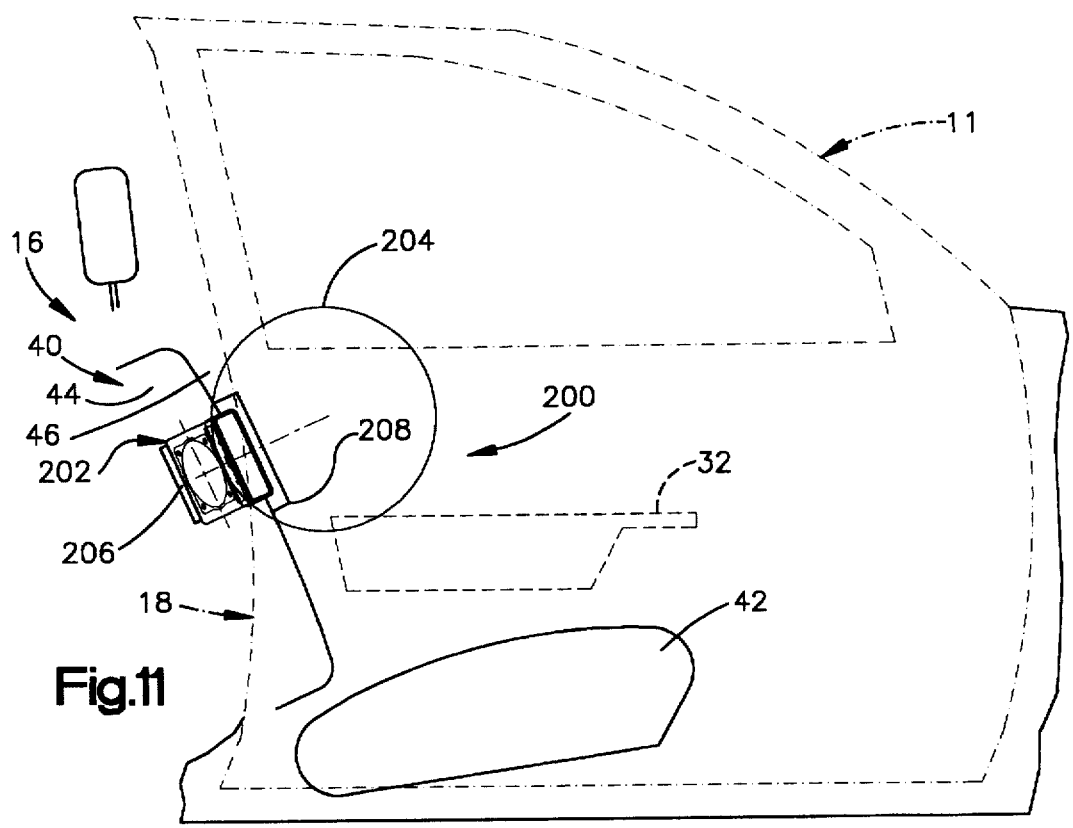
FIG. 11 is a schematic view similar to FIG. 1 showing a vehicle occupant restraint apparatus comprising a second embodiment of the present invention.

A vehicle occupant restraint apparatus 200 comprising a second embodiment of the present invention is shown schematically in FIG. 11. The apparatus 200 is shown to be mounted in the vehicle 11, and is substantially similar to the apparatus 10. The apparatus 200 thus includes an electrical circuit (not shown) like the electrical circuit 180, and further includes an air bag module 202 with an air bag 204 like the air bag module 14 and the air bag 12. However, the air bag module 202 is supported on the seat 16 in the seat back assembly 40 rather than the seat cushion assembly 42.

A bracket 206 similar to the bracket 164 (FIG. 2) supports the air bag module 202 on the frame 44 of the seat back assembly 40. The pad 46 is provided with a deployment door portion 208 like the deployment door portion 170 of the seat cushion 50 (FIG. 2). The air bag module 202 is thus supported on the seat back assembly 40 so as to direct the air bag 204 to move from the seat back assembly 40 into forceful contact with the inner trim panel 30 of the door 18 when the air bag 204 is inflating toward the inflated condition shown in FIG. 11. The air bag 204 is then constrained by the door 18 and the seat 16 so as to reach a constrained volume, and to reach an elevated internal fluid pressure at a relatively early time, in substantially the same manner as described above with reference to the air bag 12 in the apparatus 10.

Figure 12:
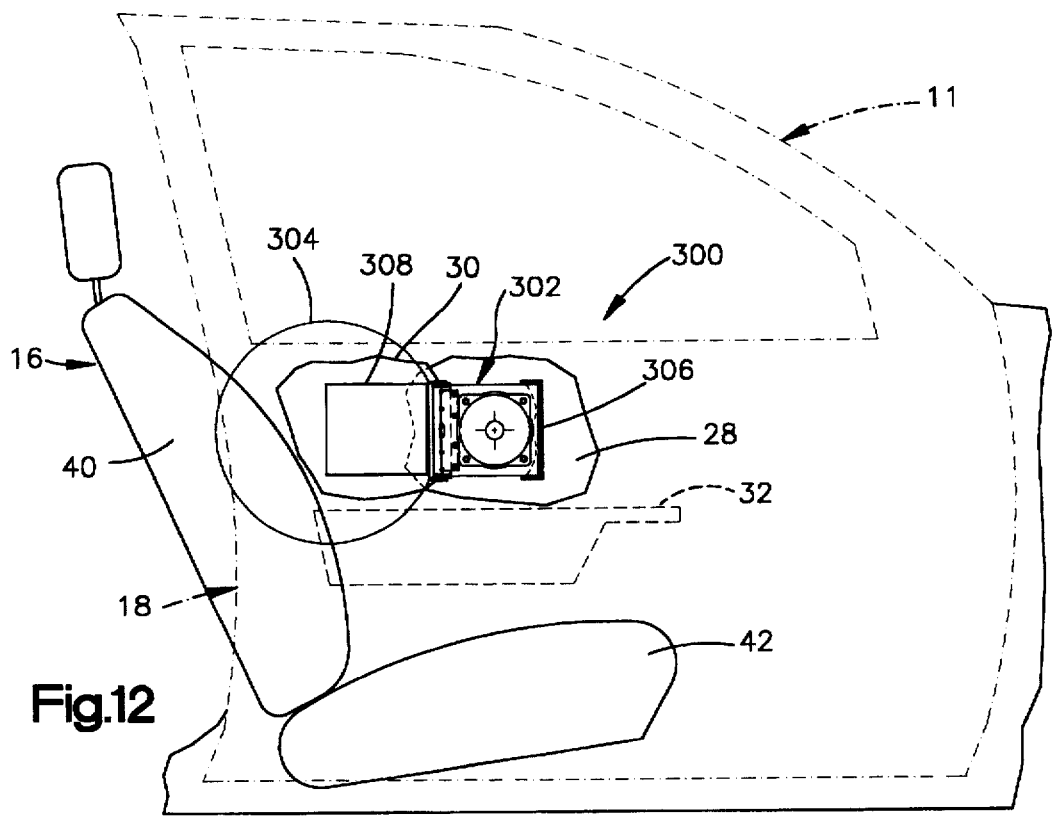
FIG. 12 is a schematic view similar to FIG. 1 showing a vehicle occupant restraint apparatus comprising a third embodiment of the present invention.

A vehicle occupant restraint apparatus 300 comprising a third embodiment of the present invention is shown schematically in FIG. 12. The apparatus 300 is shown to be mounted in the vehicle 11, and also is substantially similar to the apparatus 10. Accordingly, the apparatus 300 also includes an electrical circuit (not shown) like the circuit 180, as well as an air bag module 302 with an air bag 304 like the air bag module 14 and the air bag 12. However, the air bag module 302 is supported on the door 18 rather than the seat 16.

The air bag module 302 is preferably supported on the inner structural panel 28 of the door 18 in a known manner, such as by a weld 306, with the air bag 304 being stored between the inner structural panel 28 and the inner trim panel 30. The inner trim panel 30 is provided with a deployment door 308 of known construction. The air bag module 302 is thus supported on the door 18 so as to direct the air bag 304 to move from the door 18 into forceful contact with the seat back assembly 40 when the air bag 304 is inflating toward the inflated condition shown in FIG. 12. As a result, the air bag 304 is constrained by the seat 16 and the door 18 so as to reach a constrained volume, and to reach an elevated internal fluid pressure at a relatively early time, in substantially the same manner as described above with reference to the air bag 12 in the apparatus 10 and the air bag 204 in the apparatus 200.

Figure 13:
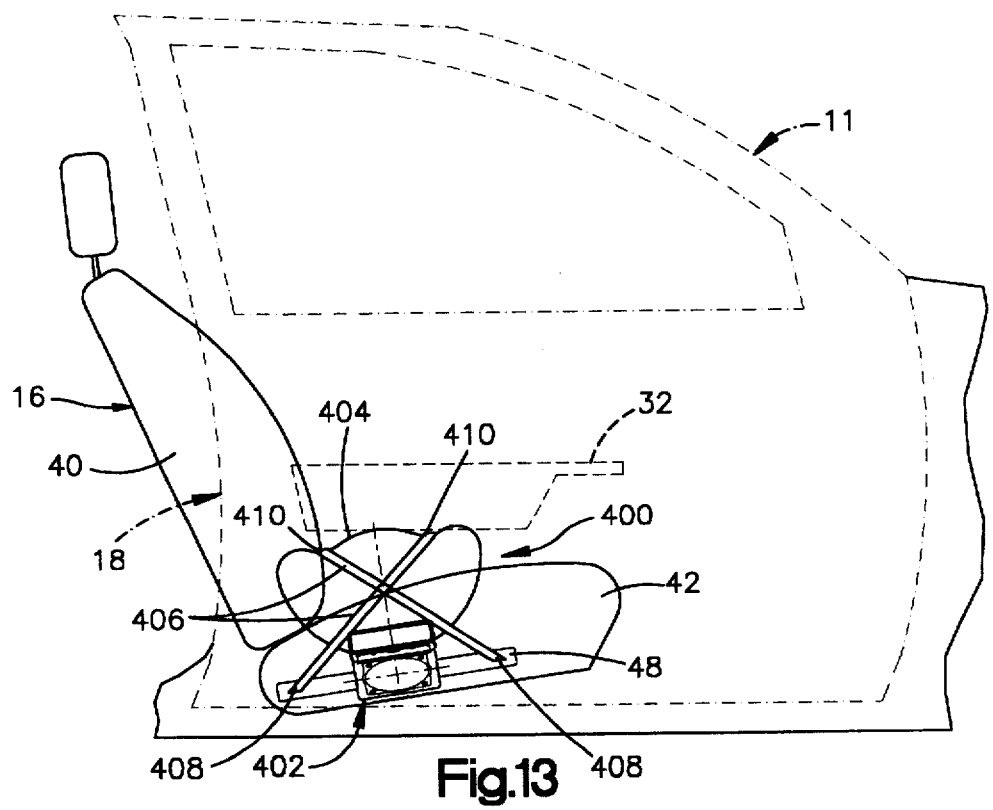
FIG. 13 is a schematic view similar to FIG. 1 showing a vehicle occupant restraint apparatus comprising a fourth embodiment of the present invention.

A vehicle occupant restraint apparatus 400 comprising a fourth embodiment of the present invention is shown schematically in FIG. 13. The apparatus 400 is shown to be mounted in the vehicle 11, and also is substantially similar to the apparatus 10. The apparatus 400 thus includes an electrical circuit (not shown) like the electrical circuit 180, and further includes an air bag module 402 and with an air bag 404 like the air bag module 14 and the air bag 12. The air bag module 402 is supported on the seat 16 in the seat cushion assembly 42 in substantially the same manner as described above with reference to the air bag module 14. The air bag module 402 is thus supported on the seat 16 so as to direct the air bag 404 to move between the seat 16 and the door 18 when the air bag 404 is inflating.

The apparatus 400 further includes a pair of tethers 406. Each of the tethers 406 has an inner end 408 and an outer end (not shown) anchored to the frame 48 in the seat cushion assembly 42, and has a mid point 410 sewn to the body of the air bag 404. The tethers 406 extend across each other and around the air bag 404 when the air bag 404 is inflating, as shown in FIG. 13.

As in the first, second and third embodiments of the present invention described above, the air bag 404 is constrained by the seat 16 and the door 18 so as to reach a constrained volume of not more than approximately 50–60% of its fully inflated volume capacity at approximately 6–8 milliseconds after the gas begins to flow into the air bag 404 to inflate the air bag 404. As a result, the internal fluid pressure of the air bag 404 reaches approximately 70–100% of the maximum internal fluid pressure attained by the air bag 404 at approximately 6–8 milliseconds after the gas begins to flow into the air bag 404. The internal fluid pressure in the air bag 404 is thus increased at a greater rate in accordance with the present invention so that the air bag 404 more quickly reaches elevated internal fluid pressure levels.

As an additional feature of the fourth embodiment of the present invention, the air bag 404 is controlled by the tethers 406 so as to take an inflated shape which is predetermined by the arrangement of the tethers 406. For example, the air bag 404 has a fully inflated volume capacity and a shape which would enable it to adjoin both the pelvic and abdominal regions of the anatomy of an occupant of the seat 16 if the air bag 404 were inflated freely to its fully inflated volume capacity. However, as shown in FIG. 13, the tethers 406 are arranged so as to confine the air bag 404 in an inflated shape in which the air bag 404 will adjoin only the lower, pelvic region of the occupant's anatomy, rather than the both the pelvic and abdominal regions.

Moreover, like the air bag module 14 in the first embodiment of the present invention, the air bag module 402 in the fourth embodiment is supported in the seat cushion assembly 42 at an angle of approximately 30°. Therefore, the inflating air bag 402 is directed to remain adjacent to the pelvic region of the occupant's anatomy, as described above with reference to the air bag 12.

From the above description of the invention, those skilled in the art will perceive improvements, changes and modifications. For example, although the invention has been described with reference to inflating an air bag between a vehicle seat and an adjacent vehicle door, the invention could also be used to inflate an air bag between a vehicle seat and another side portion of the vehicle, such as a fixed side panel of the vehicle. Such improvements, changes and modifications within the skill of the art are intended to be covered by the appended claims.

Having described the invention, the following is claimed:

1. Apparatus for inflating an inflatable vehicle occupant restraint, said apparatus comprising:

directing means for directing inflation fluid into the vehicle occupant restraint, said directing means including a directing structure containing a solitary inflator, said inflator having a housing with outlet openings for emitting said inflation fluid in a first direction;

said directing structure having surface means for defining an exit opening through which said inflation fluid can flow from said directing structure into the restraint in a second direction opposite to said first direction, said directing structure further having wall means for directing said inflation fluid to turn from said first direction to said second direction;

said wall means including first and second curved wall surfaces which are spaced from said exit opening in said first direction, each of said curved wall surfaces facing toward said exit opening and being concave relative to said exit opening;

said directing structure having an axis extending from said exit opening to said wall means in said first direction;

said directing structure further having a first side wall on a first side of said axis and a second side wall on a second side of said axis, said first curved wall surface extending in an arc which is centered approximately midway between said axis and said first side wall, said second curved wall surface extending in an arc which is centered approximately midway between said axis and said second side wall.

2. Apparatus as defined in claim 1 wherein said curved wall surfaces meet at said axis.

3. Apparatus as defined in claim 1 wherein said first curved wall surface has a first radius of curvature, said second curved wall surface having a second radius of curvature equal to said first radius of curvature.

4. Apparatus as defined in claim 1 wherein said housing has a cylindrical shape centered on an inflator axis, said outlet openings being arranged in an array extending circumferentially around said inflator axis, said outlet openings thus being arranged to emit said inflation fluid radially outward from said inflator structure in a plurality of directions including both said first and second directions.

5. Apparatus as defined in claim 4 wherein said array of outlet openings is located between said curved wall surfaces and said exit opening in said directing structure.

6. Apparatus for restraining an occupant of a vehicle seat adjacent to a side portion of the vehicle, said apparatus comprising:

an inflatable vehicle occupant restraint;

a source of inflation fluid;

directing means for directing inflation fluid from said source into said restraint to inflate said restraint, said inflation fluid increasing the internal fluid pressure of said restraint toward a maximum level as said inflation fluid flows into said restraint; and supporting means for supporting said restraint in a position from which said restraint moves between the vehicle seat and the side portion of the vehicle when said restraint is inflating, said supporting means thus directing said restraint to be constrained by the vehicle seat and the side portion of the vehicle to reach a constrained volume at which said internal fluid pressure is approximately 70–100% of said maximum level at approximately 6–8 milliseconds after said directing means begins to direct said inflation fluid into said restraint;

said apparatus further comprising means for confining said restraint to remain beneath the abdominal region of the anatomy of an occupant of the vehicle seat, said means for confining said restraint including a pair of tethers which engage said restraint to control the shape of said restraint, said tethers extending across each other and around said restraint when said restraint is inflating;

each of said tethers having opposite ends anchored to the vehicle seat.

7. Apparatus for restraining an occupant of a vehicle seat adjacent to a vehicle door having an armrest structure projecting toward the vehicle seat, said apparatus comprising:

an inflatable vehicle occupant restraint; and means for inflating said restraint into a space between the vehicle seat and the vehicle door;

said inflating means directing an inlet flow of inflation fluid into said restraint in an inclined direction extending sideways relative to the seat and upward from the seat to the armrest structure, said inflating means thus inflating said restraint across said space toward and against the armrest structure in said inclined direction under the influence of said inlet flow of inflation fluid;

said restraint becoming blocked by the armrest structure from further inflation in said inclined direction under the influence of said inlet flow of inflation fluid, said inflating means thus causing said restraint to be pressurized by said inflation fluid more quickly than if said restraint were not blocked from further inflation in said inclined direction by the armrest structure;

said restraint having an inflation fluid inlet opening, said inflating means comprising an inflator and a flow-directing structure, said flow-directing structure having walls which direct said inlet flow of inflation fluid from said inflator to said inlet opening in said inclined direction.

8. Apparatus as defined in claim 7 further comprising means for mounting said flow-directing structure in a vehicle in a position and an orientation which directs said restraint to remain adjacent to a pelvic region of the occupant below an abdominal region of the occupant when said restraint is being inflated by said inflating means.

9. Apparatus as defined in claim 8 wherein said orientation in inclined from a horizontal line such that said inclined direction extends upwardly at an angle of approximately 30° from a horizontal direction.

10. Apparatus as defined in claim 7 wherein said restraint has a fully inflated volume capacity, said inflating means causing said restraint to be blocked by the armrest structure when said restraint reaches a partially inflated volume which is a predetermined percentage of said fully inflated volume capacity.

11. Apparatus as defined in claim 10 wherein said partially inflated volume is not more than approximately 50–60% of said fully inflated volume capacity.

12. Apparatus as defined in claim 7 wherein said inflating means inflates said restraint toward a maximum internal fluid pressure, said movement of said restraint against the vehicle side part causing said restraint to reach an internal fluid pressure which is a predetermined percentage of said maximum internal fluid pressure at a predetermined time.

13. Apparatus as defined in claim 12 wherein said internal fluid pressure is approximately 70–100% of said maximum internal fluid pressure, said predetermined time being approximately 6–8 milliseconds after said inlet flow of inflation fluid begins to flow into said restraint.

14. Apparatus for restraining an occupant of a vehicle, said apparatus comprising:

a vehicle seat;

a vehicle door adjacent to said seat, said door including an armrest structure projecting toward said seat;

an inflatable vehicle occupant restraint; and means for inflating said restraint into a space between said seat and said door;

said inflating means directing an inlet flow of inflation fluid into said restraint in an inclined direction extending sideways relative to said seat and upward from said seat to said armrest structure, said inflating means thus inflating said restraint across said space toward and against said armrest structure in said inclined direction under the influence of said inlet flow of inflation fluid;

said armrest structure comprising means for blocking said restraint from further inflation in said inclined direction under the influence of said inlet flow of inflation fluid, said armrest structure thus causing said restraint to be pressurized by said inflation fluid more quickly than if said restraint were not blocked from further inflation in said inclined direction by said armrest structure;

said restraint having an inflation fluid inlet opening, said inflating means comprising an inflator and a flow-directing structure, said flow-directing structure having walls which direct said inlet flow of inflation fluid from said inflator to said inlet opening in said inclined direction.

15. Apparatus as defined in claim 14 further comprising means for mounting said flow-directing structure in a vehicle in a position and an orientation which directs said restraint to remain adjacent to a pelvic region of the occupant of said seat below an abdominal region of the occupant when said restraint is being inflated by said inflating means.

16. Apparatus as defined in claim 15 wherein said orientation is inclined from a horizontal line such that said inclined direction extends upwardly at an angle of approximately 30° from a horizontal direction.

17. Apparatus as defined in claim 14 wherein said restraint has a fully inflated volume capacity, said armrest structure blocking said restraint from further inflation in said inclined direction when said restraint reaches, a partially inflated volume which is a predetermined percentage of said fully inflated volume capacity.

18. Apparatus as defined in claim 17 wherein said partially inflated volume is not more than approximately 50–60% of said fully inflated volume capacity.

19. Apparatus as defined in claim 14 wherein said inflating means inflates said restraint toward a maximum internal fluid pressure, said blocking by said armrest structure causing said restraint to reach an internal fluid pressure which is a predetermined percentage of said maximum internal fluid pressure at a predetermined time.

20. Apparatus as defined in claim 19 wherein said internal fluid pressure is approximately 70–100% of said maximum internal fluid pressure, said predetermined time being approximately 6–8 milliseconds after said inlet flow of inflation fluid begins to flow into said restraint.

* * * * *